Nov. 3, 1953   H. W. SAWYER ET AL   2,657,648
DOUGH WORKING AND SHAPING MACHINE
Filed June 10, 1950   5 Sheets-Sheet 3

Inventors
Hilon W. Sawyer
+ Louis Getty
BY
Harry Cook
Attorney.

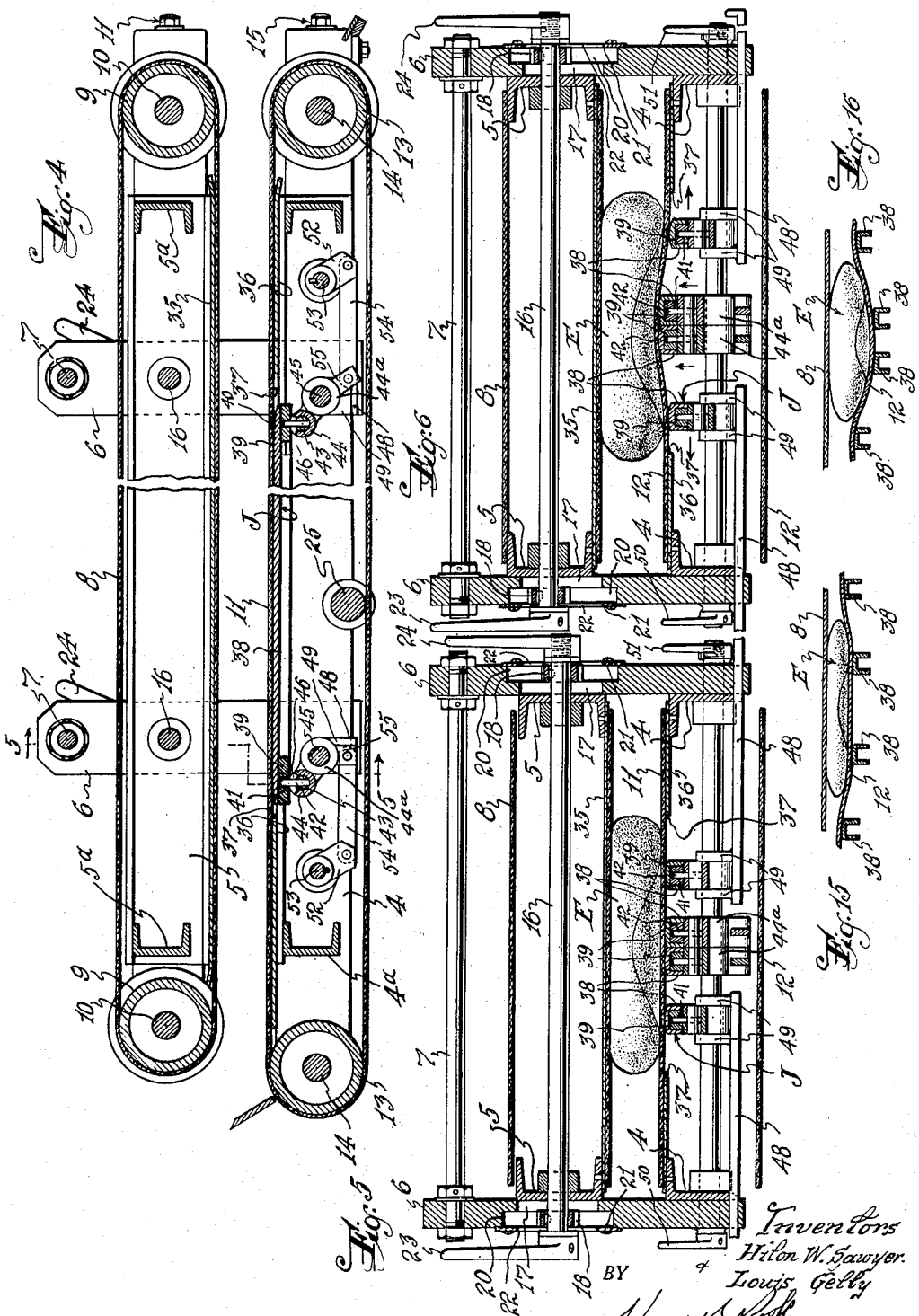

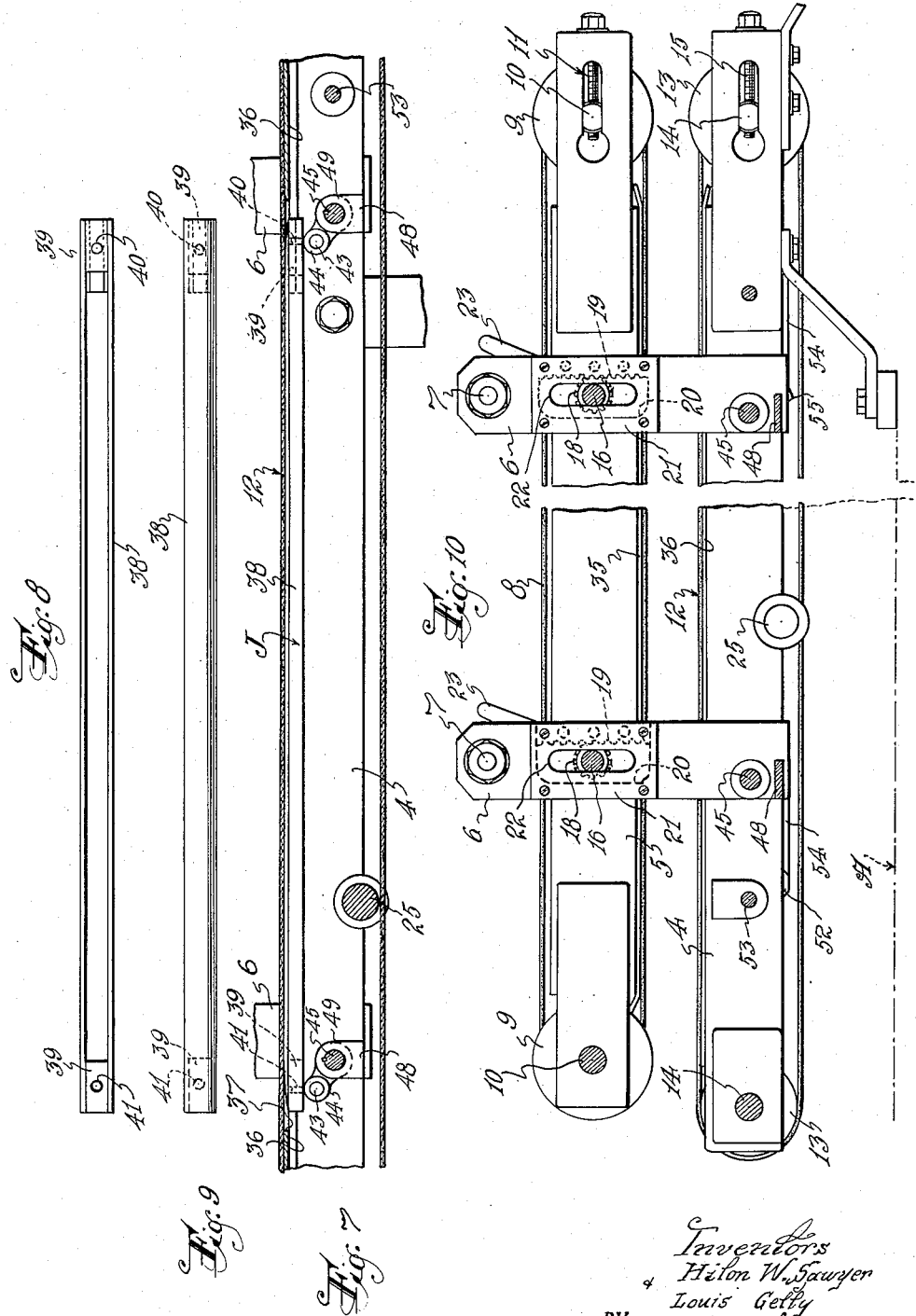

Patented Nov. 3, 1953

2,657,648

UNITED STATES PATENT OFFICE 2,657,648

DOUGH WORKING AND SHAPING MACHINE

Hilon W. Sawyer, Nutley, and Louis Gelly, Newark, N. J., assignors to Thomson Machine Company, Belleville, N. J., a corporation of New Jersey Application June 10, 1950, Serial No. 167,402

5 Claims. (Cl. 107—9)

This invention relates in general to apparatus for working and shaping dough, and more particularly the invention contemplates machines wherein a roll of dough is molded or kneaded into a loaf between two relatively movable surfaces, for example, between two spaced and opposed reaches of two belts or the reach of a belt and a stationary compression plate, one object of the invention being to provide apparatus of this character which shall embody a novel and improved construction and combination of parts to insure a thorough working and shaping of the dough mass in a short time.

The invention is also directed to a machine having a packed or padded dough molding surface of the general character described and claimed in Patent No. 2,082,753, granted on June 1, 1937 to Edward T. Parsons and Hilon W. Sawyer, assignors to Thomson Machine Company, and another object of the invention is to provide a dough working surface which shall comprise a flexible element such as a canvass belt, and an adjustable pad or packing at the side of the belt opposite the surface thereof that contacts with the dough, whereby the shape of said molding surface can be easily and quickly changed to accurately control the distribution of the dough in the roll or mass under varying conditions and of varying shapes.

A further object is to provide such a machine for working and shaping dough masses which shall include packing bars underlying the reach of the belt and means for adjusting at will said bars both laterally of the belt and angularly with respect to the plane of said reach of the belt, so that the shape of the molding space can be widely modified in accordance with the nature of the dough, the weight of the dough mass and the length of the desired loaf being worked and to cause even distribution of the dough in the roll or loaf.

Other objects, advantages and results of the invention will be brought out by the following description in conjunction with the accompanying drawings, in which Figure 1 is a side elevation of a dough working and shaping machine embodying our invention, showing it in conjunction with a known type of dough sheeting and curling apparatus which is illustrated in vertical longitudinal section;

Figure 4 is an enlarged central vertical longitudinal sectional view, approximately on the plane of the line 4—4 of Figure 2, with portions omitted for clarity;

Figure 5 is a transverse sectional view, approximately on the plane of the line 5—5 of Figure 4, showing the adjustable packing and the upper belt in one position;

Figure 6 is a similar view, showing the adjustable packing and the upper belt adjusted to change the shape of the molding space between the upper and lower belts;

Figure 7 is an enlarged vertical sectional view, approximately on the plane of the line 7—7 of Figure 3;

Figure 8 is a bottom plan view of one of the packing bars;

Figure 9 is a top plan view thereof;

Figure 10 is an enlarged vertical sectional view, approximately on the plane of the line 10—10 of Figure 2;

Figure 11 is a schematic side elevational view of the two dough-working belts, showing the manner of operating upon a roll of dough;

Figure 12 is a perspective view of the roll of dough after the dough-working operation;

Figure 13 is a view similar to Figure 11, showing the dough-working apparatus embodying the invention in combination with another type of dough curling apparatus;

Figure 13a is a perspective view of the roll of dough formed by the apparatus shown in Figure 13;

Figure 14 is an enlarged fragmentary sectional view, approximately on the plane of the line 14—14 of Figure 3;

Figure 14a is a fragmentary transverse vertical sectional view, approximately on the plane of the line 14a—14a of Figure 14;

Figure 15 is a schematic transverse sectional view through the packing bars and the belt reach thereon, illustrating another possible adjustment of the packing bars to provide a loaf of a different shape;

Figure 16 is a similar view, showing another adjustment of the packing bars to provide another specially shaped loaf having pointed ends, and Figure 17 is a schematic top plan view of a modification of the invention.

Figure 1:
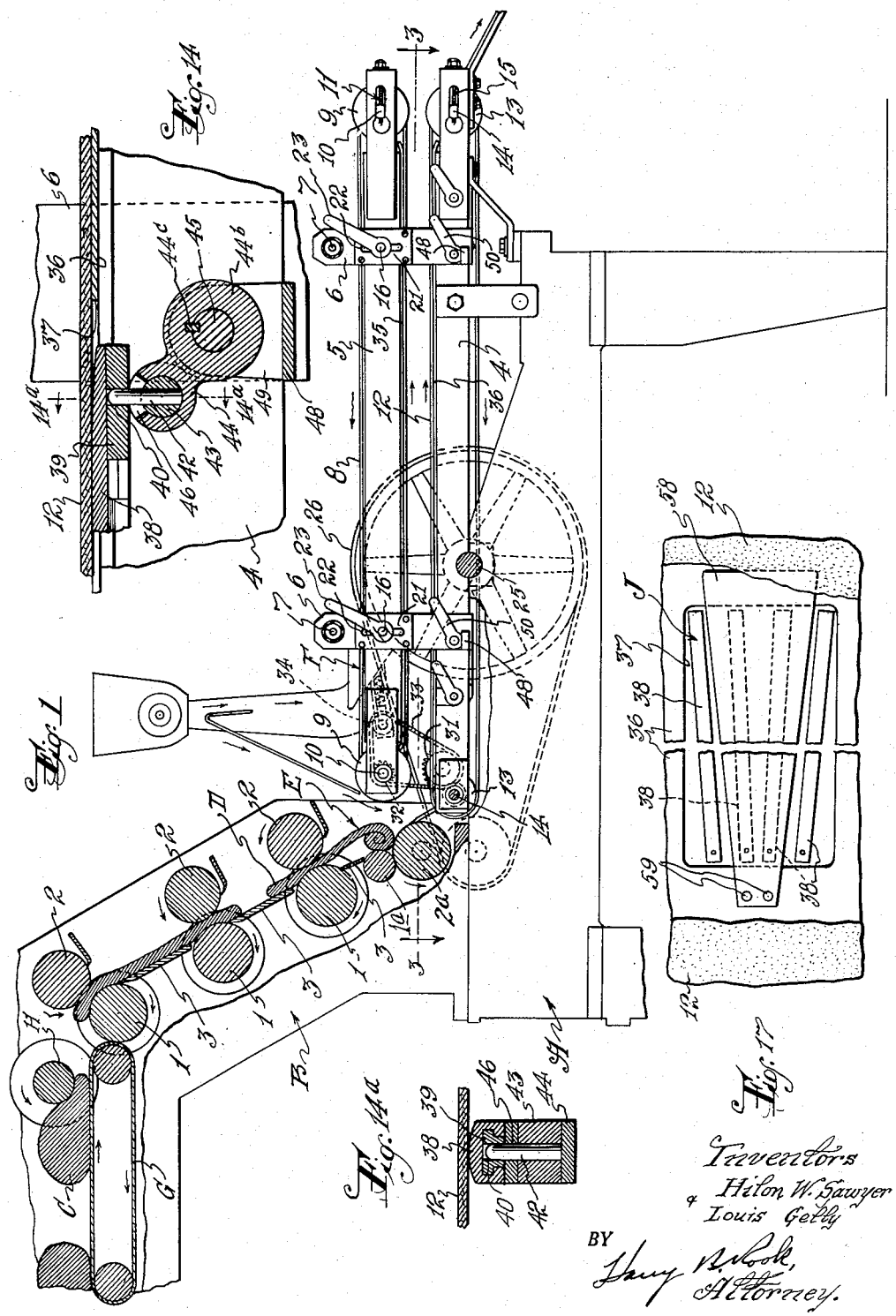
Figure 2:
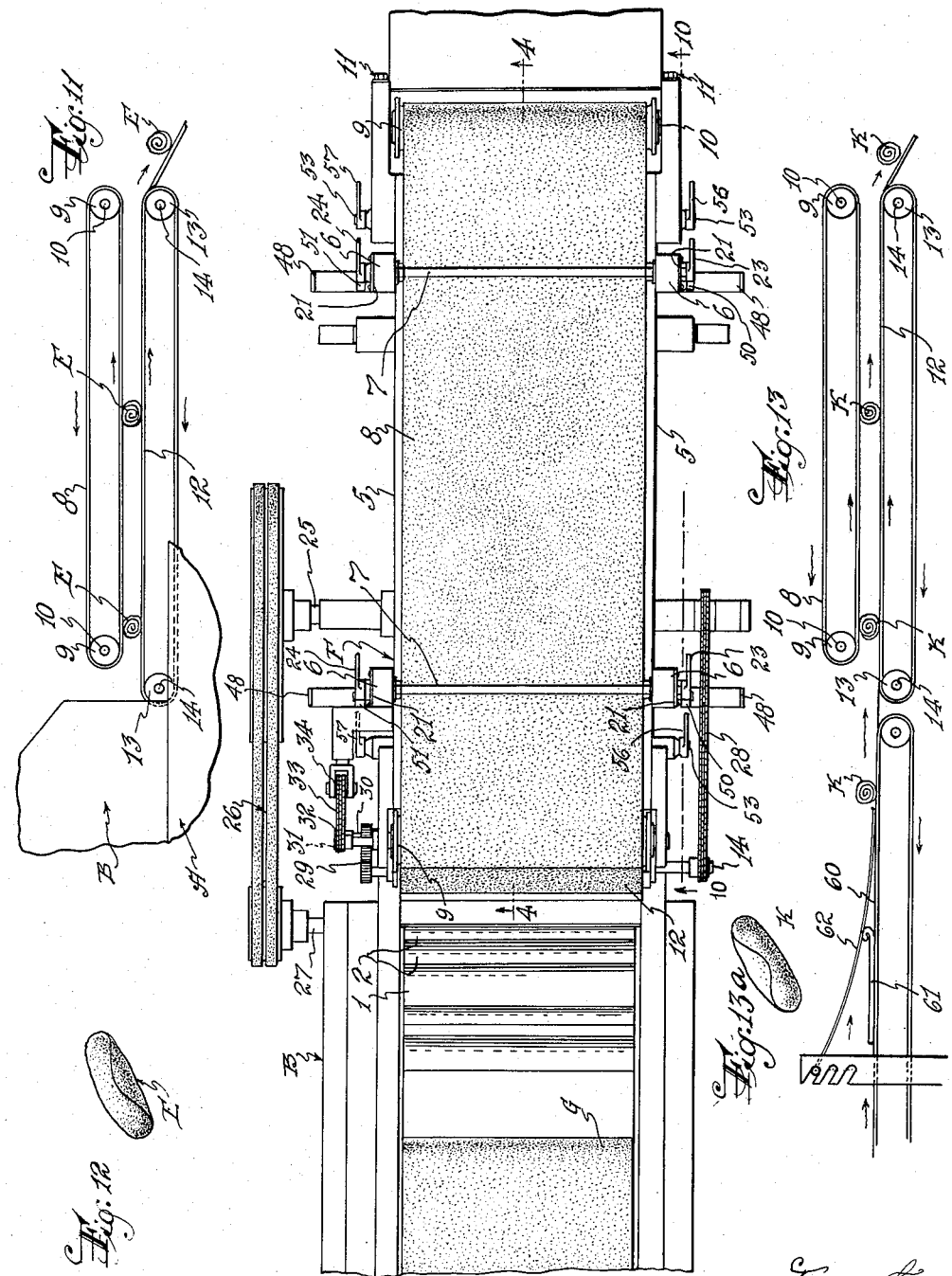
Figure 2 is a top plan view of the machine illustrated in Figure 1.
Figure 3:
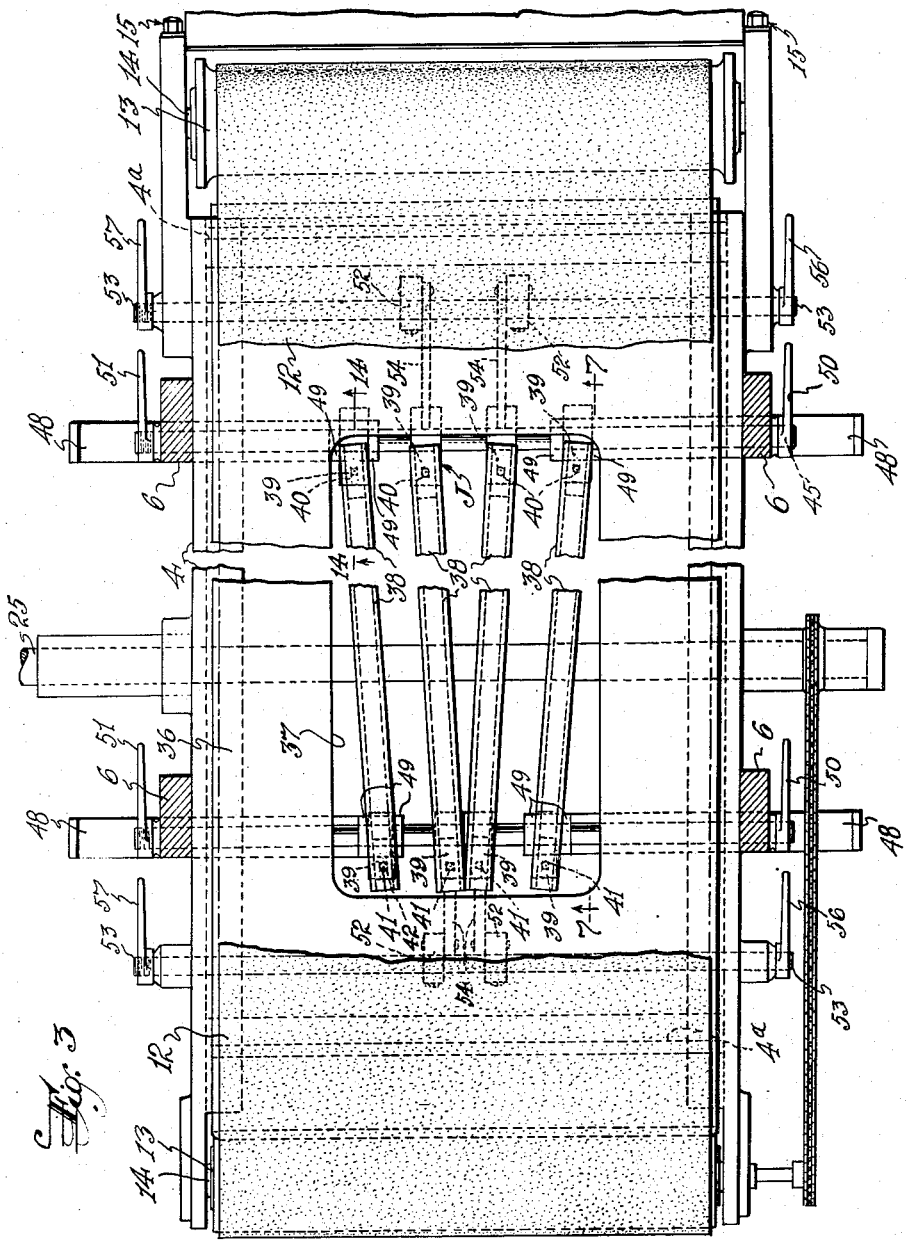
Figure 3 is an enlarged horizontal sectional view, approximately on the plane of the line 3—3 of Figure 1, with certain parts omitted for clearness in illustration.

For the purpose of illustrating the principles of the invention, we have shown it in conjunction with a known type of dough sheeting and curling apparatus, but it should be understood that the invention may be used in other types of apparatus within the spirit and scope of the invention.

As shown, the machine comprises a main frame A on which is mounted an auxiliary frame B which comprises two side pieces, one of which is broken away to show the dough sheeting rollers in transverse section. Between the side pieces of the frame B are a plurality of dough sheeting rolls arranged in pairs, each pair comprising a flanged roll 1 and a flangeless roll 2 which are adapted to receive a lump of dough C between them for forming the dough into a sheet D which is curled in a known way by rolls 1a and 2a into a spiral roll E that is deposited into the molding apparatus constituting the invention and generally designated F. The lump of dough C is fed by a conveyor G to a dough flattening roll H which cooperates with one roller of the conveyor for preliminarily flattening the lump before it is fed to the upper pair of sheeting rolls. The sheet of dough D is guided from one pair of sheeting rolls to the next by guide plates 3.

The dough molding apparatus F is mounted on the main frame A and comprises upper and lower supplemental frames formed of side bars 4 and end bars 4a and side bars 5 and end bars 5a, respectively, there being two pairs of posts 6 mounted on the side bars 4 between which the upper supplemental frame is vertically movable and tiltable relatively to the lower supplemental frame. A tie rod 7 connects the upper ends of the posts of each pair.

Mounted on and between the upper pair of side bars 5 is an endless fabric belt 8 which passes over the rollers 9 that are journaled on shafts 10 in the side bars, one of said shafts being adjustable toward and away from the other by suitable known mechanism 11 to maintain the desired degree of tension on the belt. Similarly, on and between the lower side bars 4 is a flexible belt 12 carried by rollers 13 journaled on shafts 14 in the side bars, one of which is adjustable by suitable means which may be identical with the means 11.

The upper bars are so mounted that the lower reach of the upper belt 8 is normally in spaced, opposed relation to the upper reach of the lower belt 12 to form a dough molding space between said reaches; and the upper side bars are adjustable vertically to vary the distance between said reaches of the belts. As shown, the side bars 5 are channel-shaped and have their channels facing each other as best shown in Figure 5 and two shafts 16 are journaled in said side bars, the opposite ends of each shaft extending through slots 17 in the posts 6 that are disposed at opposite sides of the frame. Each shaft 16 is provided at each end thereof with a pinion 18 which meshes with a rack 19 secured in a recess 20 in the corresponding post 6. A cover plate 21 closes each recess 20 and has a slot 22 through which extends the corresponding shaft 16. A handle 23 is fixedly mounted on one end of each shaft 16 outside the corresponding cover plate 21, while a similar handle 24 is screw threaded on the opposite end of each shaft. By manipulation of the handles 24 the shafts 16 and the upper side bars 5 can be firmly clamped on the posts 6 in any of differently spaced relations to the lower side bars 4 so as to adjust the space between the juxtaposed reaches of the two belts.

The belts 8 and 12 are driven by any suitable mechanism, but as shown there is a counter-shaft 25 journaled on the lower side bars 4 of the central frame and connected by a belt and pulley drive 26 to a power take-off shaft 27 of the dough sheeting mechanism which may be driven as usual by an electric motor. The shaft 25 has a chain and sprocket connection 28 with the shaft 14 of one of the rollers 13 of the lower belt, and said shaft has a geared connection 29 with a counter-shaft 30 on which is a sprocket 31 which is connected to a sprocket 32 on the shaft 10 of one of the rollers 9 of the upper plate, by a chain 33 which also passes around chain-tightening sprocket 34. With this construction, the juxtaposed reaches of the two belts will be driven in the same direction as indicated by the arrows and one of the belts, preferably the top belt, is driven at a higher speed than the other belt. One end of the lower belt 4 extends toward the sheeting and curling mechanism beyond the corresponding end of the upper belt so that the spirally coiled roll of dough E will drop from the curling mechanism onto the lower belt and be rolled, worked or kneaded between the belts.

To provide firm backings for the juxtaposed reaches of the belts, a metal plate 35 is secured to the lower edges of the upper side bars 5 above the lower reach of the upper belt, and a similar plate 36 is mounted on the lower side bars bars 4 beneath the upper reach of the lower belt and associated with adjustable packing generally designated J which supports a portion of the upper reach of the lower belt through an opening 37 in the plate 36.

As shown, this packing comprises a plurality of packing bars 38 which may be supstantially identical in construction and each of which comprises a channel having mounting blocks 39 one at each end thereof, one of which is slidable, the blocks having the respective holes 40 and 41 each to receive a pin 42 that is carried by a rod 43 mounted to move about its horizontal axis in an actuating arm 44. Some of the arms 44 have hubs 44a rotatable on a shaft 45 while other arms have hubs 44b keyed on the shafts. Slots 46 are provided in the arms 44 to permit oscillation of the pins 42. Certain of the bars 38 are adjustable independently of the other bars, both laterally of the lower belt and angularly with respect to the plane of the upper reach of the belt. As shown, the packing bars 38 are spaced horizontally and the arms 44 supporting the two outermost bars are slidable but non-rotatable relatively to the two corresponding shafts 45, being keyed on said shafts as indicated at 44c. Said arms may be slid longitudinally of the shafts by any suitable means for varying the spacing of the bars and for changing the angular relation of the bars to each other, but as shown a pull slide 48 is mounted in each post 6 for each of the corresponding arms and has fingers 49 disposed at opposite sides of said arm so that by pulling the slide longitudinally of itself, the corresponding end of the packing bar connected to said arm may be swung in a plane approximately parallel to the upper reach of the lower belt.

For swinging the packing bars into relations angularly disposed to the plane of the belt reach, or tilting the bars in vertical planes, each shaft 45 has a handle 50 rigidly connected to one end thereof and a handled nut 51 screwed on the other end thereof, said handles 50 permitting the shafts to be oscillated to swing the arms 44, and the handled nuts 51 serving to clamp the shafts in adjusted positions.

The hubs 44a of the arms which support the intermediate packing bars are freely rotatable on the shafts 45 and are actuated by crank arms 52 that are rigidly connected to operating shafts 53 journaled in the side bars 4, which crank arms 52 are connected by links 54 to pivot lugs 55 on the hubs 44a. Each shaft 53 has an operating handle 56 at one end and a handled nut 57 at the other end so that the shafts may be rotated by the handles 56 for swinging the bars in vertical planes and the bars may be locked in adjusted positions by the handled nuts 57.

With this construction, it will be observed that the packing bars 38 may be disposed in approximately a common flat plane with the belt reach and in a certain spaced relation as shown in Figure 5, or the outermost packing bars may be moved horizontally relatively to the other bars and some or all of the packing bars may be elevated to change the shape of the dough working surface formed by the belt reach, as shown in Figure 6. Also the upper belt may be moved toward and from the lower belt to adjust the size of the dough working space between the juxtaposed reaches of the two belts, Figure 5 showing one spacing of the belts and Figure 6 showing a different spacing. These adjustments may be widely varied in accordance with the weight and size of the dough roll and the nature of the dough, whether soft or hard, and to obtain a desired distribution of the dough in the roll. As the roll is moved by and between the belts, blunt pointed ends are formed on the roll, the optimum dough texture and skin is ensured, and the loaf is sealed as desired.

In some instances it may be desirable to provide a flexible metal sheet between the packing bars and the belt reach so as to ensure a more uniform support of the belt between the spaced packing bars. Such a construction is schematically illustrated in Figure 17 where the sheet metal sheet is designated by the reference character 58 and overlies the opening 37 in the plate 36 with one end fastened as by screws or rivets 59 to the plate 36 and the other end loosely lying on the upper surface of said plate.

As above indicated, the apparatus of the invention may be used with various types of sheeting and curling mechanisms and regardless of the direction in which the roll of dough is spirally rolled. Figures 11 and 12 illustrate the roll of dough E coiled in one direction by the apparatus shown in Figure 1, while Figures 13 and 13a show a roll L of dough spirally rolled in the opposite direction by a so-called drag curling mechanism which includes a belt 60 which pulls the sheet of dough 61 beneath a flexible fabric or woven metal sheet 62 so as to roll the dough sheet 61 to produce the roll K. The roll of dough K may be fed into the curling mechanism from sheeting rolls like the rolls 1, 2 hereinbefore described, the drag curling sheet 62 serving in general the same function as the curling rollers 1a and 2a of Figure 1. The dough roll K can be transferred from the curling mechanism 60—62 to the space between the mounting belts 8 and 12 by any suitable means, for example, by gravity or by manual pushing of the roll on to the belt 12. The belts 8 and 12 are identical with those hereinbefore described and roll, work and knead the dough roll K in the same way in which said belts act upon the roll E as hereinbefore described.

From the foregoing it will be understood by those skilled in the art that the packing bars 38 may be adjusted into various positions to produce rolls of dough of many different shapes. For example Figure 15 shows one arrangement of the packing bars to produce a so-called French loaf E, while in Figure 16 another adjustment of the packing bars which may be utilized for producing a Vienna or pointed loaf E.

While we have shown and described the invention as embodied in certain structural details, it will be understood that this is primarily for the purpose of illustrating the principles of the invention and that many modifications and changes may be made in the construction of the apparatus within the spirit and scope of the invention. For example it will be apparent that the adjustable packing could be mounted on the upper plate 35 instead of on the lower plate 36, and that the belt opposite the one associated with the packing could be eliminated and replaced by a stationary plate. It will also be apparent that the adjustable packing could be mounted on both the upper plate 25 and the lower plate 36 so that there is means for adjusting the packing under both reaches of the belts.

We claim:

1. In a dough working machine, the combination of a frame, two dough working elements thereon having spaced opposed surfaces forming a molding space between them to receive and roll a mass of dough between them, one of said surfaces being formed by a reach of a flexible belt, and means for at will changing the shape of said surface comprising packing bars at the side of said belt reach opposite said surface and movable horizontally and tiltable in vertical planes to flex said belt reach, means mounting said bars for movement in vertical planes including horizontal shafts on said frame, arms rotatable about the axes of said shafts and means pivotally connecting each of said arms to one end portion of one of said bars to tilt said bars in vertical planes, certain of said arms being also movable longitudinally of the corresponding shafts for horizontally moving the bars connected to said certain arms.

2. In a dough working machine, the combination of a frame, two dough working elements thereon having spaced opposed surfaces forming a molding space between them to receive and roll a mass of dough between them, one of said surfaces being formed by a reach of a flexible belt, and means for at will changing the shape of said surface comprising packing bars at the side of said belt reach opposite said surface and movable horizontally and tiltable in vertical planes to flex said belt reach, means mounting said bars for movement in vertical planes including horizontal shafts on said frame, arms rotatable on said shafts, other arms non-rotatably but longitudinally movably connected to said shafts, means pivotally connecting each of said arms to one end portion of one of said bars, means for rotating said shafts to swing the second-mentioned arms for tilting certain of said bars in vertical planes, means for rotating the first-mentioned arms on said shafts to tilt the corresponding bars, and means for sliding said second-mentioned arms longitudinally of said shafts.

3. In a dough working machine, the combination of a frame, two dough working elements thereon having spaced opposed surfaces forming a molding space between them to receive and roll a mass of dough between them, one of said surfaces being formed by a reach of a flexible belt, a plate engaging the side of the belt reach opposite said surface and having an opening therethrough, and means for at will changing the shape of said surface comprising elements at the side of said belt reach opposite said surface and extending through said opening to flex said belt reach, and a flexible sheet overlying said bars and interposed between them and said belt reach, said sheet being fastened to said plate at a portion of its margin and the other portions of the sheet being free to flex relatively to said plate so as to bridge the spaces between said bars.

4. In a dough working machine the combination of a frame, two dough working elements thereon having spaced opposed surfaces forming a moulding space between them to receive and roll a mass of dough between them, one of said surfaces being formed by a reach of a flexible belt, and means for at will changing the shape of said surface comprising elongate packing bars extending in a spaced side-by-side relation generally longitudinally of said belt reach in abutting relation to the side thereof opposite said surface, means mounting at least the outer packing bars on the frame to provide for movement of at least one end of each thereof relatively to the other and transversely of said belt reach and in planes parallel to said belt reach, and means for tilting all of said bars into planes angularly disposed to the plane of the belt reach, whereby to flex said belt reach and vary the contour of said surface.

5. In a dough working machine the combination of a frame, two dough working elements thereon, having spaced opposed surfaces forming a moulding space between them to receive and roll a mass of dough between them, one of said surfaces being formed by a reach of a flexible belt, and means for at will changing the shape of said surface comprising elongate packing bars extending side-by-side generally longitudinally of said belt reach in abutting relation to the side thereof opposite said surface, means for mounting the ends of said bars for movement independently of each other in planes perpendicular to the plane of said belt reach to tilt the bars and flex said belt reach and for movement of the ends of each of at least two of said bars independently of each other in planes parallel to said belt reach and transversely of said belt reach, the last mentioned means including a member mounted on said frame at each end of the corresponding bar for movement transversely of said belt reach and means pivotally connecting said member to said bar whereby the bars can be disposed in oblique relation to each other transversely of said belt reach, means for moving the ends of each of said bars independently of each other in planes perpendicular to said belt reach, and means including said members for moving the ends of each of said two bars independently of each other transversely of said belt reach.

HILON W. SAWYER.
LOUIS GELLY.

References Cited in the file of this patent

UNITED STATES PATENTS

| Number | Name | Date |
|---|---|---|
| 1,169,472 | Embrey | Jan. 25, 1916 |
| 1,252,765 | Aeschbach | Jan. 8, 1918 |
| 1,366,266 | Lauterbur | Jan. 18, 1921 |
| 1,432,874 | Lauterbur | Oct. 24, 1922 |
| 1,537,018 | Lauterbur | May 6, 1925 |
| 1,895,634 | Lauterbur et al. | Jan. 31, 1933 |
| 2,293,109 | Bridge | Aug. 18, 1942 |

FOREIGN PATENTS

| Number | Country | Date |
|---|---|---|
| 581,723 | Germany | Aug. 1, 1933 |